April 26, 1955  F. R. WILSON  2,706,853
TUBE CUTTER
Filed July 16, 1952  3 Sheets-Sheet 1
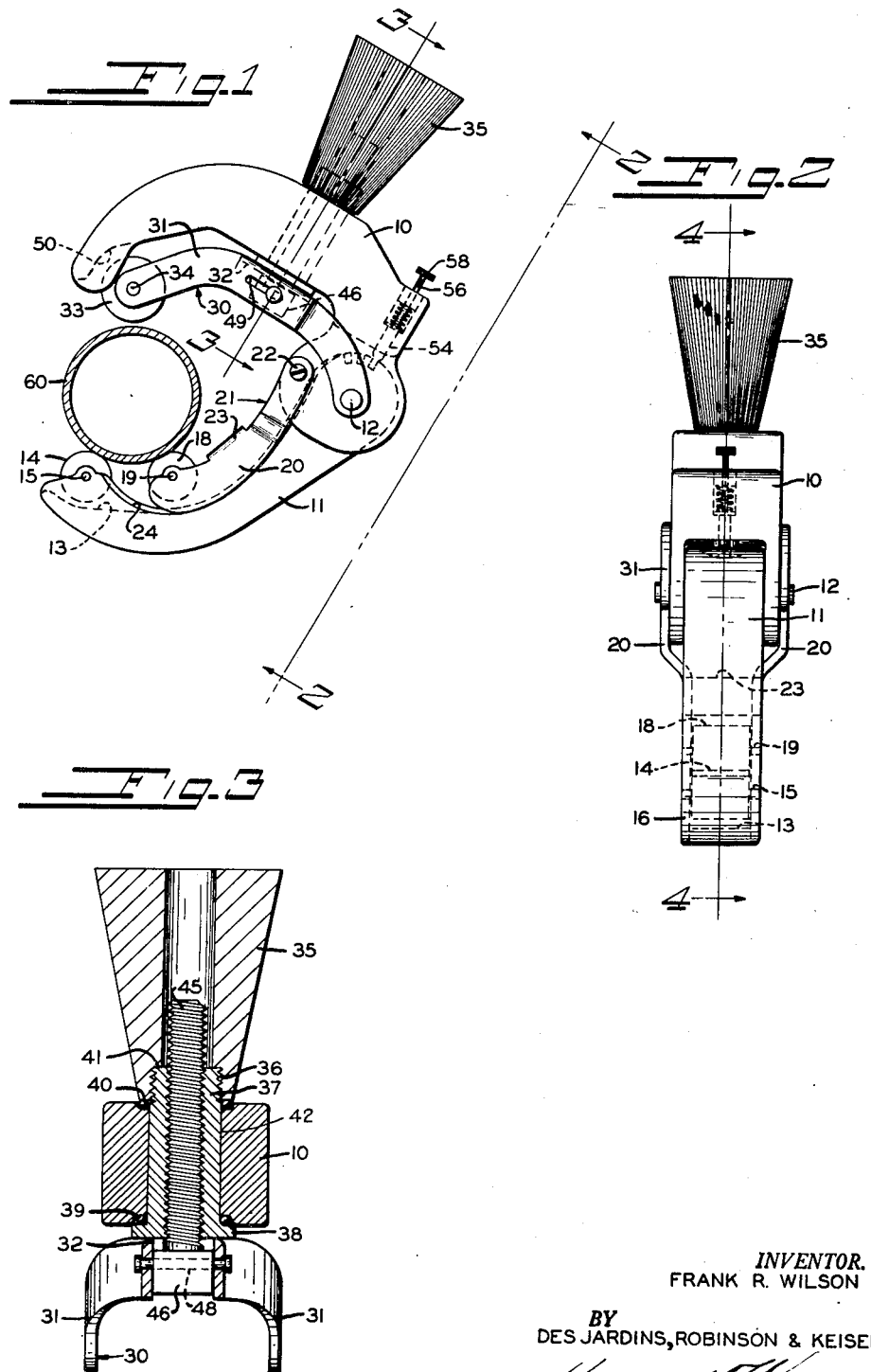
INVENTOR.
FRANK R. WILSON
BY
DES JARDINS, ROBINSON & KEISER
HIS ATTORNEYS April 26, 1955  F. R. WILSON  2,706,853
TUBE CUTTER
Filed July 16, 1952  3 Sheets-Sheet 2
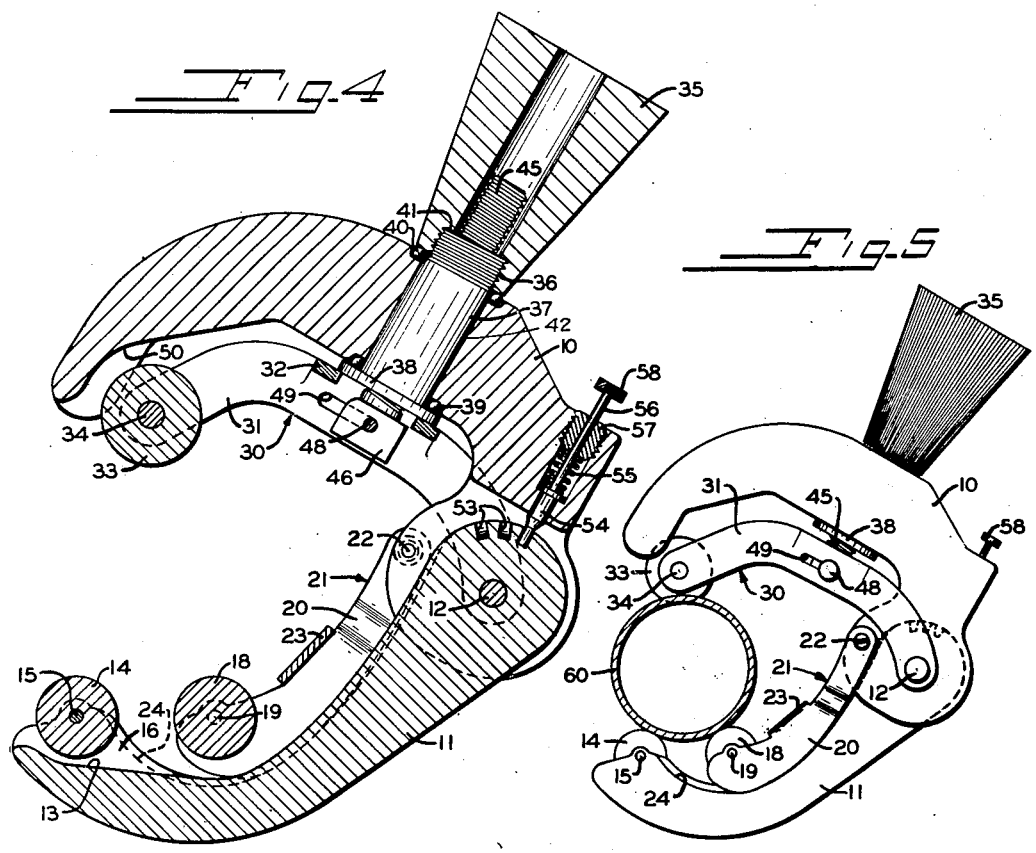
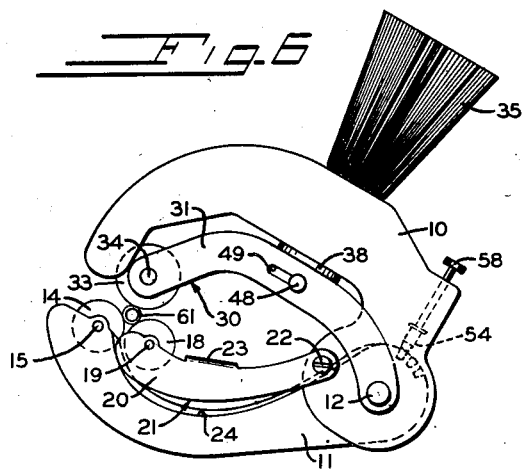
*INVENTOR.*
FRANK R. WILSON
BY
DESJARDINS, ROBINSON & KEISER
HIS ATTORNEYS April 26, 1955  F. R. WILSON  2,706,853
TUBE CUTTER
Filed July 16, 1952  3 Sheets-Sheet 3
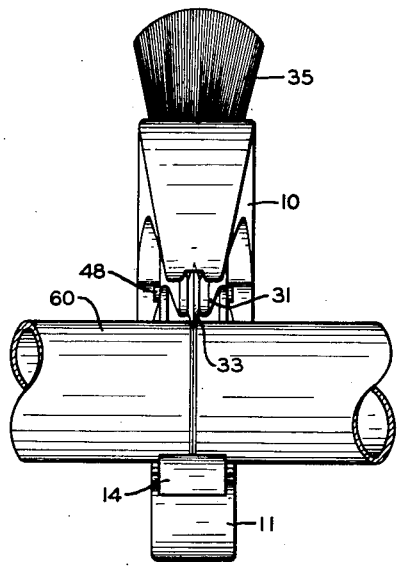
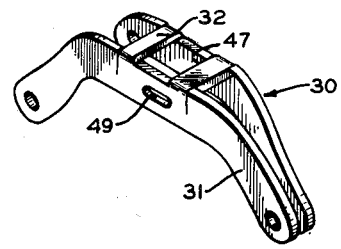
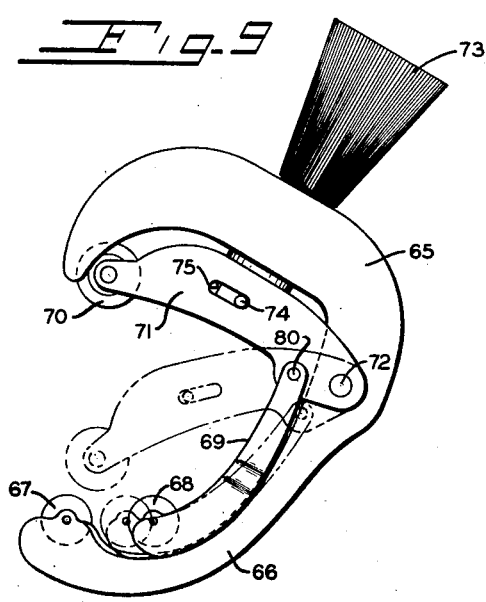
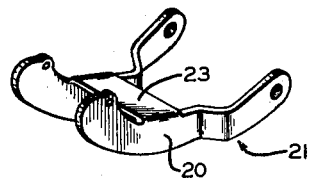
INVENTOR.
FRANK R. WILSON
BY
DES JARDINS, ROBINSON & KEISER
HIS ATTORNEYS

United States Patent Office 2,706,853
Patented Apr. 26, 1955

2,706,853

TUBE CUTTER

Frank R. Wilson, Memphis, Tenn.

Application July 16, 1952, Serial No. 299,155

6 Claims. (Cl. 30—102)

This invention relates to a tube cutter and, more particularly, to a tube cutter of novel design which is small and compact and which may readily be adjusted to fit tubes of various sizes.

All of the existing tube cutters with which I am familiar are large, bulky devices, and are usually provided with a long handle for turning the cutter on the tube as the latter is being cut. Also, none of the tools that I have seen are capable of being adjusted to fit tubes ranging in size from, say 1/8 inch to 2½ inches, outside diameter.

Accordingly, it is an object of my invention to provide a tube cutter of novel design which is smaller and more compact than known tube cutters of equivalent capacity.

Another object of my invention is to provide a tube cutter which is capable of handling tubes ranging in size from, say, 1/8 inch to 2½ inches, outside diameter.

Another object of my invention is to provide a tube cutter having a hinged body member which may be adjusted to fit various ranges of tube sizes.

Another object of my invention is to provide means for causing the spacing between the tube supporting rolls to be automatically varied in accordance with the adjustment of the body member to fit different ranges of tube sizes.

Another object of my invention is to provide a tube cutter in which the cutting wheel may be advanced or withdrawn from the work by a feed screw meshing with a manipulable nut rotatably mounted on the body of the tool.

Another object of my invention is to provide means for automatically adjusting the spacing between the tube supporting rolls as the cutting wheel is moved toward or away from the supporting rolls.

With these and other objects in view which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

Fig. 1 is a side elevation of a tube cutter incorporating the principles of my invention.

Fig. 2 is a view taken along the line 2—2 in Fig. 1.

Fig. 3 is a cross-sectional view taken along the line 3—3 in Fig. 1.

Fig. 4 is a cross-sectional view taken along the line 4—4 in Fig. 2.

Fig. 5 is a view similar to Fig. 1 but showing the cutter in engagement with the tube being cut.

Fig. 6 is a side view similar to Fig. 1 but showing the tube cutter adjusted to fit the smallest range of tube sizes.

Fig. 7 is a front view of the tube cutter shown in Fig. 5.

Fig. 8 is a detail view of the arm on which the cutter is mounted.

Fig. 9 is a side view of a modified form of tube cutter in which the frame is made in one piece.

Fig. 10 is a detail view of the arm on which the adjustable supporting roll is mounted.

As shown in the accompanying drawings, my new style tube cutter is provided with a hinged type of frame which includes a body member 10 and a work supporting arm or leg 11 pivoted thereto. As shown in Fig. 2, the body member 10 is bifurcated at one end to receive the upper end of the leg 11 which is pivotally attached to the body member by a pivot pin 12. At its lower end, the leg 11 is provided with a milled groove or recess 13, as best shown in Figs. 2 and 4, within which is mounted a supporting roll 14. This roll is journaled on a pin 15 which extends between, and is supported by, the flanges 16 which form the sides of the recess 13.

Also supported by the leg 11 is a second work supporting roll 18 which is journaled on a pin 19 supported between the lower ends of a pair of identical side arms 20 which are yoked together by a strap 23 to form a composite arm 21. At their upper ends, the arms 20 are pivoted on screws 22 fastened to the body member 10. The bottom edges of arms 20 are adapted to rest on shoulders 24 formed in either side of the leg 11 so as to provide support and guidance for the free ends of the arms 20. More will be said about the function of the shoulders 24 in a later portion of this specification.

Also pivotally supported on the body member 10 by the pin 12 is a cutter arm 30 which, like the arm 21, is formed of a pair of identical side arms 31 yoked together by a connecting strap or bail 32. A cutter 33 is supported at the free end of the arm 30 by a journal pin 34 on which the cutter is free to rotate. The cutter 33 may be a bevel-edged wheel of conventional design and having a profile of the character shown in Fig. 7.

Adjustment of the arm 31 and cutter 33 relative to the body member 10 is effected by turning a handknob 35 which effects a feeding movement of the arm 30. As best shown in Fig. 4, the handknob 35 is screwed down tightly on threads 36 provided on the upper end of an internally threaded sleeve 37. On its lower end, the sleeve 37 is provided with a flange 38 which serves as a lower race for the balls 39 of an anti-friction thrust bearing. The body member 10, which is bored to receive the sleeve 37, is recessed at the lower end of the bore 42 to receive the balls 39 and provide an upper race therefor as shown in Fig. 4. The upper end of the bore 42 in the body member 10 also terminates in a groove or recess which serves as a lower race for balls 40 of a second anti-friction thrust bearing. The bottom edge of the handknob 35 serves as an upper race for the balls 40, and is so designed that when the handknob is screwed down on the threads 36 until a shoulder 41 thereon abuts against the upper end of the sleeve 37, proper clearance will be provided for the balls 39 and 40 so that the sleeve 37 and handknob 35 will be permitted to rotate freely on the body member 10.

The internal threads provided in the sleeve 37 mesh with the threads of a screw 45 as is clearly shown in Fig. 3. At its lower end, the screw 45 is provided with a square head 46 which is adapted to be received snugly between the side arms 31 of the arm 30 when the device is assembled. When thus assembled, the screw 45 passes through the aperture 47 (Fig. 8) provided in the bail 32 of the arm 30, and the headed portion of the screw 45 is connected with the arm 30 by a pin 48 which passes through the head 46 and is received within elongated slots 49 provided in the side arms 31 of the arm 30. Hence, when the handknob 35 is rotated, the screw 45 will be fed in or out of the sleeve 37 thereby causing the arm 30 and the cutter 33 to be moved toward or away from the body member 10. As shown in Fig. 4, when the arm and cutter are retracted so as to bring the bail 32 against the flange 38, the cutter 33 will be received within a milled slot 50 former in the tip of the body member 10.

As brought out earlier herein, the tube cutter may be adjusted for different sizes of tubing so that one tool will serve to cut all the various sizes of tubing ranging from, say, 1/8 inch to 2½ inches, outside diameter. This adjustment of the tool is effected by swinging the leg 11 about the pivot pin 12 and locking it in any one of a plurality of adjusted positions. As best shown in Fig. 4, the uppe. edge of the leg 11 is provided with three notches or semi-circular slots 53 in which the lower end of a lockin plunger 54 is adapted to be received to thereby hold the leg 11 in any one of three adjusted positions. The plunger 54 is slidable within a bore provided in the body member 10 and is urged into locking engagement with the notches 53 by a spring 55 which surrounds a stem 56 provided on the plunger 54. The spring 55 is compressed between the upper end of the plunger 54 and the bottom of an apertured screw plug 57 which serves as a guide for the stem 56. On the upper end of the stem 56 is a pullknob 58 by which the plunger 54 may be withdrawn against the urgency of the spring 55 from one of the notches 53, and permit the leg 11 to be swung about pivot pin 12 to bring another one of the notches 53 beneath the plunger 54. Release of the pull-knob 58 will permit the plunger 54 to engage the notch 53 located therebeneath and so effectively lock the leg in its new position. As shown in Fig. 4, three notches 53 are provided in the upper edge of the leg 11 so that the leg may be adjusted to any one of three positions. It is to be understood, of course, that the number of adjusted positions of the leg 11 may be varied as desired by providing more or fewer notches 53 for receiving the locking plunger 54.

With the leg 11 in the position shown in Fig. 4, when the locking plunger 54 is withdrawn and the leg swung clockwise to bring one of the other notches 53 beneath the plunger, the roll 18 on the arm 21 will be moved closer to the roll 14 by reason of the eccentricity of the pivot 22 with respect to the pivot pin 12. Hence, as the leg 11 is moved clockwise, the side arms 20 will move outwardly along the leg 11, the lower edges of the arms being supported and guided by the shoulders 24 provided on either side of the leg 11. The shoulders or grooves 24 are so shaped as to cause the roll 18 always to be properly positioned with respect to the roll 14 and the cutter 33 to provide adequate and firm support for the tubing which is to be cut, such as the piece of tubing 60 shown in Figs. 1, 5 and 7. When the leg 11 is moved so that the left-most notch 53 is located beneath the plunger 54, the leg 11 will assume the position shown in Fig. 6 in which the tool is properly adjusted for cutting the smallest sized tubing. As shown in Fig. 6, a piece of small diameter tubing 61 is supported by the rolls 14 and 18, which are now spaced only a slight distance apart, so as to lie directly beneath the cutter 33. As shown in this figure, the shoulders 24 have acted upon the outer ends of the side arms 20 so as to cause the arm 21 to be lifted and the roll 18 to be elevated so as to lie in the proper position with relation to the roll 14 to support the tube 61 directly beneath the cutter 33. Hence, when the cutter is moved down into contact with the tube 61 by turning the handknob 35, and the tool thereafter rotated on the tube 61, the cutter 33 will make the desired cut in the tube. This cut may be made progressively deeper by suitable downward feeding of the cutter by turning of the handknob 35.

In Fig. 9 of the drawings there is shown a modified form of tube cutter in which the frame 65 is made all in one piece, i. e., with the lower leg 66 integral with the upper portion of the frame. Here again, as in the case of the tool shown in Figs. 1 to 7, inclusive, a work supporting roll 67 is rotatably mounted on the outer extremity of the leg 66, and a second work supporting roll 68 is rotatably mounted on the lower end of an auxiliary arm 69 which corresponds to the arm 21 of the tool shown in Figs. 1 to 7. Here again, a cutter 70 is rotatably supported on the free end of a cutter arm 71 which is pivotally mounted on the frame 65 by means of a pivot pin 72. The arm 71 and cutter 70 may be fed up and down, toward and away from the supporting rolls 67 and 68, by means of a handknob 73 which corresponds to the handknob 35 shown in Figs. 1 to 7, inclusive. The handknob 73, like the handknob 35, is mounted on the upper end of an internally threaded sleeve journaled in the frame 65. The threads of the sleeve mesh with the threads of a screw which is connected by a pin 74 with a slot 75 provided in the arm 71. Hence, when the handknob 73 is turned, the arm 71 and the cutter 70 will be fed up or down depending upon the direction of rotation of the handknob just as in the case of the tool shown in Figs. 1 to 7, inclusive.

In the modified form of the tube cutter shown in Fig. 9, the auxiliary arm 69 is pivotally connected at 80 to the arm 71 so that as the latter arm moves downward from the position shown in Fig. 9, the auxiliary arm will be moved outwardly along the lower leg 66 thereby moving the supporting roll 68 toward the supporting roll 67. As in the case of the tool shown in Figs. 1 to 7, inclusive, the free end of the auxiliary arm is supported and guided by shoulders provided on either side of the leg 66, these shoulders corresponding to the shoulders 24 shown in Fig. 4. Hence, for any position of the arm 71, the spacing between the rolls 67 and 68 and the relative positions of these rolls will be such as to provide proper support for the tubing which is to be cut by the device. Thus, as shown in Fig. 9, when the arm 71 is moved down to the position shown in dotted outline, the roll 68 will move to the left to the position shown in dotted outline wherein it lies only a slight distance away from the roll 67. Hence, the rolls 67 and 68 will be properly positioned to support a piece of small diameter tubing directly beneath the cutter 70. As the handknob 73 is rotated to withdraw the arm 71 and move the cutter 70 away from the rolls 67 and 68, the latter roll will be moved to the right, as viewed in Fig. 9, so as to provide suitable support for tubing of larger diameter for which the device will now be adjusted due to the retraction of the cutter 70.

Although I have described my invention in considerable detail and have, therefore, utilized certain specific terms and language herein, it is to be understood that the present disclosure is illustrative rather than restrictive and that various changes and modifications may be resorted to without departing from the spirit or scope of the claims appended hereto.

Having thus described my invention, what I claim as new and useful and desire to secure by United States Letters Patent, is:

1. A tube cutter comprising a body member, a cutter arm pivoted on said member, a cutter on said arm, a tube supporting means mounted on said body member, and means for adjusting said cutter arm so as to move said cutter toward or away from said tube supporting means, said adjusting means including a screw having a square head on one end thereof, a socket in said arm for receiving said head, a bore in said body member, an internally threaded sleeve supported for rotation without translation in said bore and meshing with said screw, and a handknob secured to asid sleeve for orating said sleeve so as to feed said screw in and out and cause said arm and cutter to be adjusted relative to said tube supporting means.

2. A tube cutter comprising a yoke-shaped frame, an arm having one end thereof pivoted to the central portion of said frame, a cutter mounted on the free end of said arm, a plurality of spaced rolls rotatable about different axes supported by one of the arms of said frame, and means mounted on the other arm of said yoke-shaped frame and cooperating with said pivoted arm for moving said cutter toward or away from said rolls, said means including a screw having a square head on one end thereof, a socket in said pivoted arm for receiving said head, and an internally threaded element supported in said other arm of said frame for meshing with said screw, whereby rotation of said element will cause said cutter to be adjusted relative to said rolls.

3. The tube cutter of claim 2 including a pin and slot connection between said square head and said arm for retaining said head in said socket.

4. A tube cutter comprising a body member, means on said body member for supporting the tube to be cut, a holder mounted on said body member for movement toward and away from said supporting means, a cutter mounted on said holder, and means for feeding said cutter into the tube to be cut, including a bore in said body member, an internally threaded sleeve rotatably journaled in the bore in said body member, spaced abutments on said sleeve lying on opposite sides of said body member for preventing endwise movement of the sleeve in the body member, a screw having one end thereof meshing with the thread in said sleeve, and attachment means to fasten the other end of said screw to said holder and hold the screw against rotation whereby turning of said sleeve will cause feeding movement of said cutter relative to the tube to be cut.

5. The tube cutter of claim 4 including a knob secured to one end of said sleeve, and an aperture in said knob to receive said one end of said screw.

6. The tube cutter of claim 5 wherein the end of said knob lying adjacent to said body member constitutes a part of said abutment means.

References Cited in the file of this patent

UNITED STATES PATENTS

| Number | Name | Date |
|---|---|---|
| 343,233 | Esten | June 8, 1886 |
| 721,660 | Bonney | Mar. 3, 1903 |
| 812,210 | Kovacs | Feb. 13, 1906 |
| 1,006,080 | Geoffroy | Oct. 17, 1911 |
| 1,376,936 | Hermistone | May 3, 1921 |
| 1,728,504 | Nonneman | Sept. 17, 1929 |
| 1,773,096 | Cousineau | Aug. 19, 1930 |
| 2,227,348 | Johnson | Dec. 31, 1940 |
| 2,456,882 | Mackey | Dec. 21, 1948 |
| 2,582,406 | Bachli et al. | Jan. 15, 1952 |